(12) United States Patent  
Liggett

(10) Patent No.: US 8,893,852 B2  
(45) Date of Patent: Nov. 25, 2014

(54) NON-SINGLE POINT OF FAILURE MEMBER SLIDE

(76) Inventor: James Allen Liggett, Martin, MI (US)

( * ) Notice: Subject to any disclaimer, the term of this patent is extended or adjusted under 35 U.S.C. 154(b) by 390 days.

(21) Appl. No.: 13/115,664

(22) Filed: May 25, 2011

(65) Prior Publication Data

US 2012/0298443 A1 Nov. 29, 2012

(51) Int. Cl.
*E01B 26/00* (2006.01)
*B65G 21/22* (2006.01)

(52) U.S. Cl.
CPC ..................................... *B65G 21/22* (2013.01)
USPC ................................ 182/36; 104/94; 104/108

(58) Field of Classification Search
USPC ............ 104/89, 94, 106, 108; 472/15; 182/36
See application file for complete search history.

(56) References Cited

U.S. PATENT DOCUMENTS

| | | | | | |
|---|---|---|---|---|---|
| 304,730 | A | * | 9/1884 | High | 182/36 |
| 316,969 | A | * | 5/1885 | High | 182/36 |
| 2,478,004 | A | * | 8/1949 | Newell | 482/69 |
| 2,589,803 | A | * | 3/1952 | Haley | 104/94 |
| 3,860,089 | A | * | 1/1975 | Huggett | 182/4 |
| 4,401,033 | A | * | 8/1983 | Gerken | 104/94 |
| 4,592,686 | A | * | 6/1986 | Andrews | 410/101 |
| 4,705,422 | A | * | 11/1987 | Tsui et al. | 403/60 |
| 4,737,107 | A | * | 4/1988 | Bories et al. | 434/29 |
| 4,911,426 | A | * | 3/1990 | Scales | 482/69 |
| 5,156,233 | A | * | 10/1992 | Olsen et al. | 182/3 |
| 5,271,481 | A | * | 12/1993 | Rich | 182/3 |
| 5,647,747 | A | * | 7/1997 | Macri et al. | 434/247 |
| 5,667,461 | A | * | 9/1997 | Hall | 482/69 |
| 5,743,576 | A | * | 4/1998 | Schron et al. | 294/215 |
| 5,775,660 | A | * | 7/1998 | Coope | 248/505 |
| 5,890,328 | A | * | 4/1999 | Gleave | 52/94 |
| 5,924,260 | A | * | 7/1999 | Austin et al. | 52/698 |
| 6,032,993 | A | * | 3/2000 | Kwon | 294/215 |
| 6,315,138 | B1 | * | 11/2001 | Dyson | 212/336 |
| 6,374,456 | B1 | * | 4/2002 | Fort et al. | 16/96 R |
| 7,175,534 | B2 | * | 2/2007 | Liggett | 472/15 |
| 7,416,054 | B2 | * | 8/2008 | Liggett | 182/36 |
| 7,992,680 | B2 | * | 8/2011 | Small | 182/36 |
| 2010/0078262 | A1 | * | 4/2010 | Townend et al. | 182/36 |
| 2012/0067246 | A1 | * | 3/2012 | Liggett et al. | 104/89 |

* cited by examiner

*Primary Examiner* — Alvin Chin Shue
*Assistant Examiner* — Colleen M Chavchavadze

(57) ABSTRACT

A non single point of failure member slide having two members that extend from a second washer, downwardly through a sheath to a belt. The glide being slidably disposed within a track member.

7 Claims, 4 Drawing Sheets

NON-SINGLE POINT OF FAILURE MEMBER SLIDE

FIELD OF THE INVENTION

This invention relates to an apparatus that increases the safety when participants are challenged to walk or scale various elements or obstacles while elevated above the ground, which can test the participant's skills such as confidence or group problem solving.

BACKGROUND OF THE INVENTION

Challenge courses are structures that allow a person or team to challenge themselves by participating in various events such as walking along swinging ropes or planks, at elevated heights. These courses are also used to train military personnel. These courses are also used at recreational parks or other such centers that have go-carts and miniature golf.

The invention is a non-single point of failure member or cable slide or similarly functioning member that can be used in challenge courses to increase the safety by having a means to keep the safety cable attached to the glide, as opposed to a single weight bearing bolt.

The challenge courses in the prior art usually have a single point of failure means extending downwardly from a moveable member within a track, whereby if this means, such as a bolt fails, there is nothing securing the user relative to the track, or securing the user from possibly falling.

There exists a need for non-single point of failure member slide to increase safety for the users. There also exists the need to increase the safety while not decreasing the capacity of participants traversing the challenge course.

Multiple embodiments of the system are disclosed herein. It will be understood that other objects and purposes of the invention, and variations thereof, will be apparent upon reading the following specification and inspecting the accompanying drawings.

REFERENCE NUMERALS LIST 10 non-single point of failure member slide
20 track member
30 safety belt
40 harness
50 person or user
60 first disk
70 top disk
80 first washer
90 top washer
100 first member retention means
110 second member retention means
120 first member
130 second member
140 first member loop
150 second member loop
160 sheath
170 second disk aperture
180 first member cylinder
190 second member cylinder
200 dual member-belt fastener
210 first disk aperture
220 first washer aperture
230 top washer aperture
240 sheath-member securement device
250 slot
260 inner channel
270 track member opening
280 slit or slot

SUMMARY OF THE INVENTION

One aspect of the present invention is a non single point of failure member slide 10, comprising: a first member 120; a second member 130; said first member 120 and said second member 130 extending through a top washer 90 via a top washer aperture 230; said first member 120 terminating in a first member retention means 100; said second member 130 terminating in a second member retention means 110.

Another aspect of the present invention a non single point of failure member slide 10, comprising: a first member 120; a second member 130; said first member 120 and said second member 130 extending through a top washer 90 via at least one top washer apertures 230; said first member 120 terminating in a first member retention means 100 upwardly from said top washer 90; said second member 130 terminating in a second member retention means 110 upwardly from said top washer aperture 90; a first washer 80 disposed downwardly from said top washer 90, said first washer 80 having a first washer aperture 210 to receive at least one of said first member 120 or said second member 130 therethrough; a top disk 70 disposed downwardly from said first washer 80; said top disk 70 having a second disk aperture 170 for receiving at least one of said first member 120 or said second member 130 therethrough; a first disk 60 disposed downwardly from said top disk 70; said first disk 60 capable of receiving at least one of said first member 120 or said second member 301 therethrough via a first disk aperture 210; a sheath 160 securely disposed around both of said first member 120 said second member 130; a sheath member securement device 240 securely disposed around said sheath 160 to secure said sheath 160 to at least one of said first member 120 and said second member 130; said first member 120 extends downwardly from said sheath member securement device 240, and said second member extends downwardly from said sheath member securement device 240, said first member 120 and said second member 130 secured to a dual member belt fastener 200; and a second member cylinder 190 securely disposed around said second member 130, and a first member cylinder 180 securely disposed around said first member 120, both of said second member cylinder 190 and said first member cylinder 180 slidably disposed downwardly from said sheath member securement device 240, and upwardly from a dual member belt fastener 200, whereby a safety belt 30 may be secured to said dual member belt fastener 200 and said belt 30 secured to a harness 40 to enable a person to traverse a challenge course as the first disk 60 is slidably disposed within a track member 20.

These and other features, aspects and advantages of the present invention will become better understood with reference to the following drawings, description and claims.

DETAILED DESCRIPTION OF THE INVENTION

Figure 1:
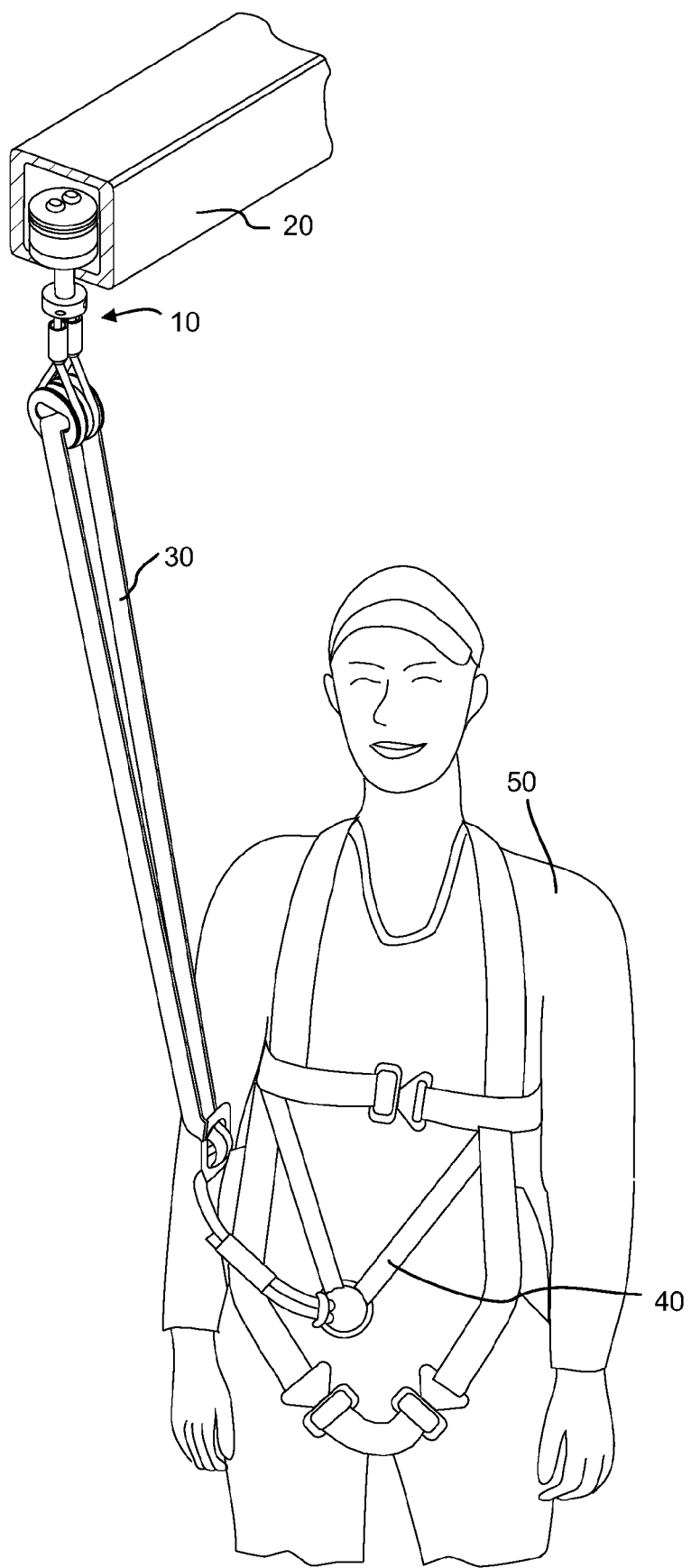
FIG. 1 is a pictorial view of one embodiment of the present invention in a track member and attached to a person.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Certain terminology will be used in the following description for convenience and reference only, and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the system and designated parts. Said terminology will include the words specifically mentioned, derivatives, and similar words. Also, "connected to," "secured to," or similar language includes the definitions "indirectly connected to," "directly connected to," "indirectly secured to," and "directly secured to."

FIG. 1 illustrates one embodiment of the present invention. The non-single point of failure member slide 10 member may be moveably disposed to be displaced along or relative to a track member 20. The non-single point of failure member slide 10 may be secured to a safety belt 30 which may be attached or removably attached to a harness 40, which may be removably secured to a user or person 50. The track member 20 may be part of a challenge course, as referenced in U.S. Pat. No. 7,175,534.

Figure 2:
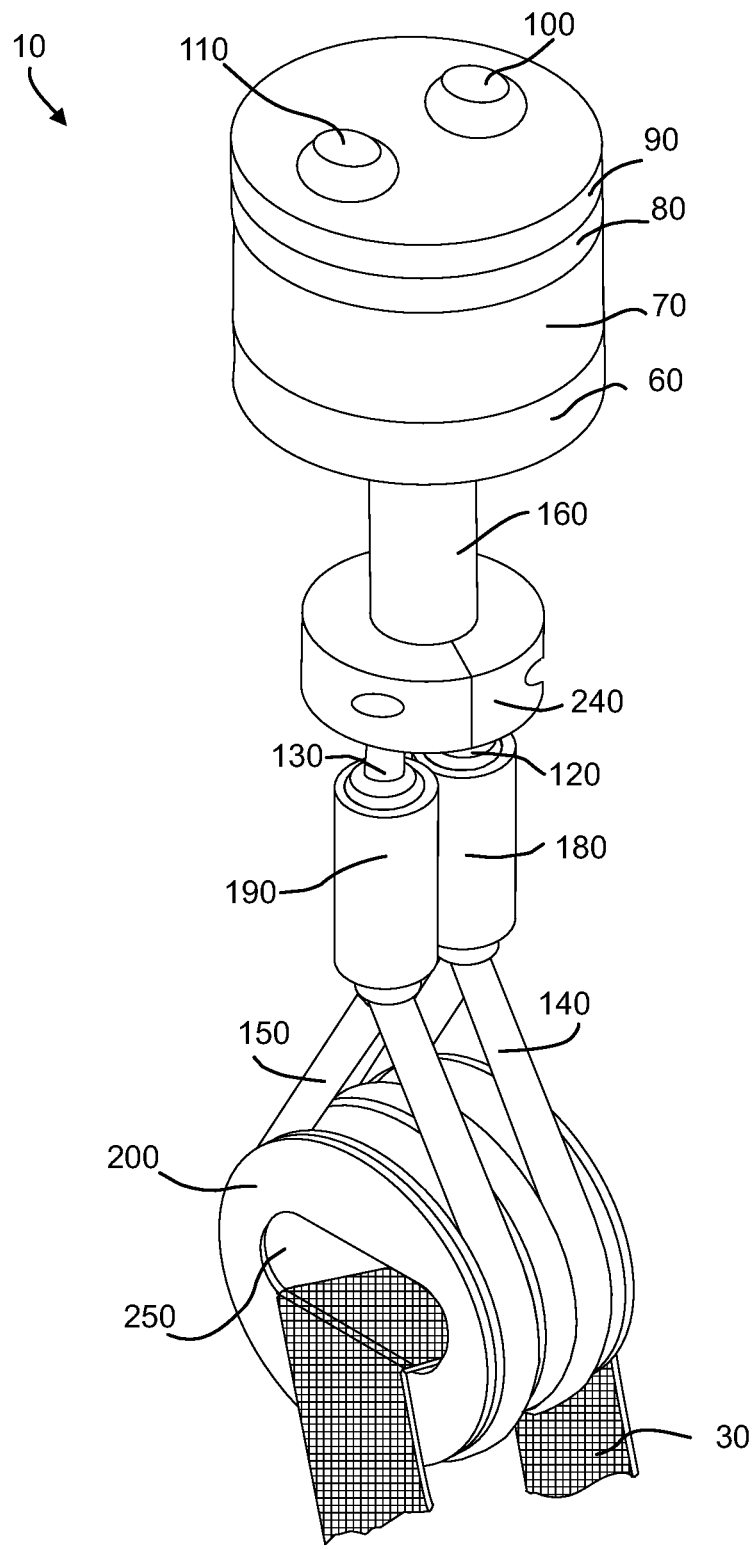
FIG. 2 is a pictorial view of one embodiment of the present invention.
Figure 4:
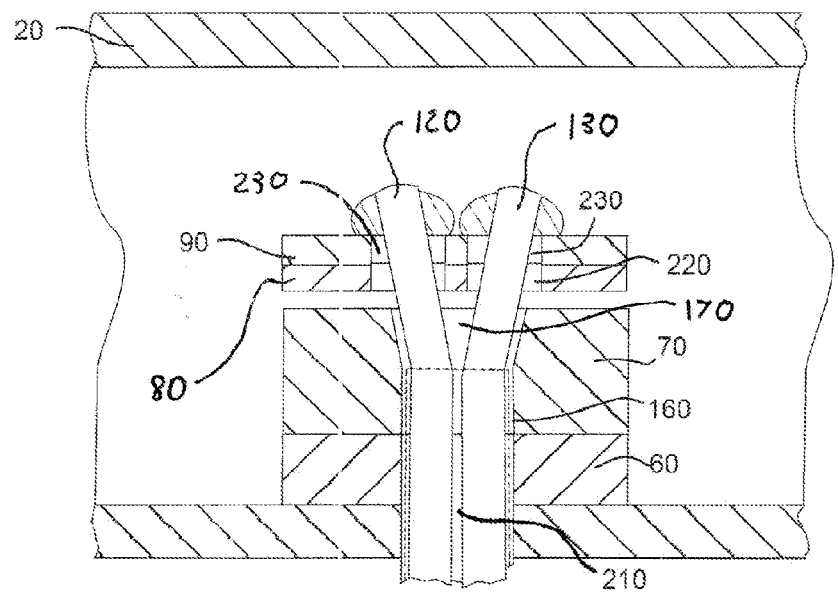
FIG. 4 is a cross-sectional view from FIG. 3.

FIG. 2 illustrates some components of one embodiment of the present invention 10. The non-single point of failure member slide 10 may have a first disk 60 with a first disk aperture 210 (best seen in FIG. 4) therethrough. Upwardly from the first disk 60 may be a top disk 70 with a second disk aperture 170 (best seen in FIG. 4) therethrough. Upwardly from the top disk 70 may be a first washer 80 having at least one first washer aperture 220. Upwardly from the first washer 80 may be a top washer 90 having at least one top washer aperture 230.

The first disk aperture 210, second disk aperture 170, first washer aperture 200, and top washer aperture 230 may receive a first member 120 and a second member 130 therethrough. The first member 120 and second member 130 may be a member, or other similarly functioning member.

There may be two first washer apertures 220, in which case the first member 120 may be disposed through one of the first washer apertures 220, and the second member 130 may be disposed through another of the first washer apertures 220.

Similarly, there may be two top washer apertures 230, in which case the first member 120 may be disposed through one of the top washer apertures 230, and the second member 130 may be disposed through another of the top washer apertures 230.

FIG. 2 illustrates how the sheath 160 may house or contain the first member 120 and the second member 130 therein. A sheath-member securement device 240 may clamp the sheath 160 to the first member 120 and second member 130. The sheath-member securement device 240 may be secured to a lower end of the sheath 160. The sheath 160 may be disposed between the sheath-member securement device 240 and the first disk 60. The sheath 160 may extend up to the top disk 70.

The first member 120 and the second member 130 may extend downwardly from the sheath-member securement device without the sheath 160. So the first member 120 and second member 130 may be exposed downwardly from the sheath-member securement device 240. A first member 120 may wrap around a groove of a dual member belt fastener 200 and have a first member 120 end portion that extends upwardly to be compressibly secured to a portion of the first member by a first member cylinder 180. In one embodiment the first member cylinder 180 may be securely disposed on the first member 120 downward from the sheath-member securement device 240, and upwardly from a first member loop 140.

A second member 130 may wrap around a groove of a dual member belt fastener 200 and have a second member 130 end portion that extends upwardly from the dual member belt fastener 200 to be compressibly secured to a portion of the second member 130 by a second member cylinder 190. In one embodiment the second member cylinder 190 may be securely disposed on the second member 130 downward from the sheath-member securement device 240, and upwardly from a second member loop 150.

A dual member-belt fastener 200 may have grooves to receive the first member 120 in one groove, and the second member 130 in another groove. The first member loop 140 and second member loop 150 may wrap within each respective groove whereby the dual-member belt fastener 200 is incapable of being removed from contact with each respective first member 120 and second member 130. A safety belt 30 may be disposed within a slot 250 of the dual-member belt fastener 200. The safety belt 30 may extend to a harness 40 that is removably secured to a person, to securely navigate a challenge course, as the non-single point of failure member slide 10 is slidably dispose within a track member 20.

Figure 3:
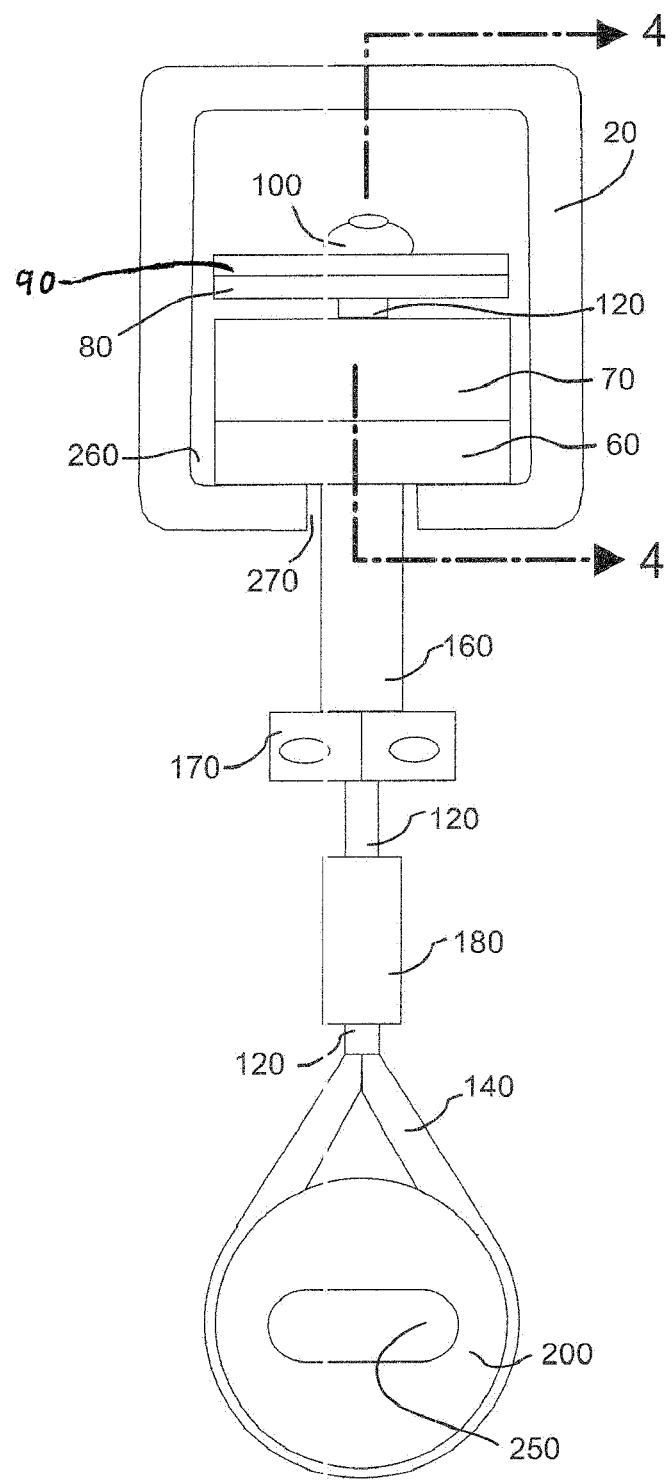
FIG. 3 is another pictorial view of one embodiment of the present invention.

As illustrated in FIG. 3, in one embodiment, the first disk 60 may be in slidable contact within an inner channel 260 of the track member 20.

In one embodiment, the sheath 160 may have a diameter less than the track member opening 270, and the first disk 60 may have a diameter greater than the track member opening 270, so that the first disk 60 is in slidable engagement with the inner channel 260.

In one embodiment the sheath 160 may extend downwardly from the track member opening 270. The sheath 160 may be in slidable engagement with the track member opening 270. The sheath 160 may be nylon to reduce noise when the sheath 60 contacts the track member opening 270, as compared to a metal member or bolt extending through the track member opening 270.

Figure 5:
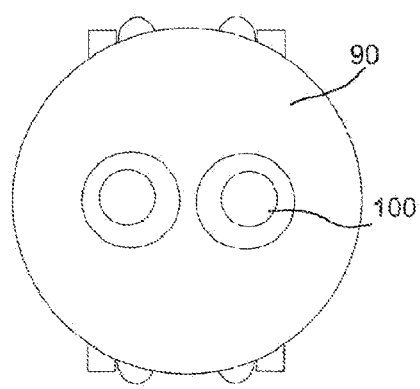
FIG. 5 is a top view of one embodiment of the present invention.

FIG. 5 illustrates one embodiment of top washer 90 of the present invention 10, and the first member retention means 100 and the second member retention means 110.

In one embodiment, at least one of either the first washer 80, the top washer 90, the first disk 60, or the top disk 70 may have a slit or slot 280 extending from a respective aperture, radially outward so that the respective disk or washer can be removed and replaced.

Figure 6:
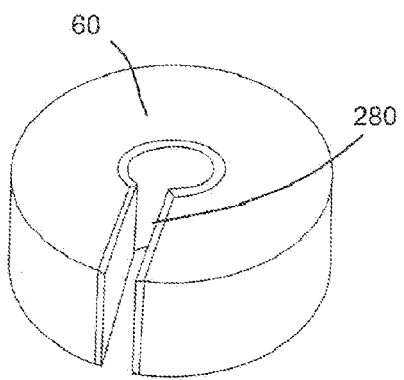
FIG. 6 illustrates the first disk.

FIG. 6 illustrates that in one embodiment the first disk 60 may have a radius of about 0.8750 inches and a slit of about 0.0313 inches in width.

In one embodiment the slit 280 may be about 0.0313 inches in width. In one embodiment, the first disk 60 may have a first disk aperture 210 having a radius of about 0.34375 inches, and the external radius of the first disk 60 may be about 0.8750 inches, or a diameter of about 1.7500 inches.

In one embodiment each the first washer 80 and top washer 90 may be made of 11 gage steel.

In one embodiment the top washer 90 may have two top washer apertures 230 that are about 0.50004 inches apart, center to center.

In one embodiment the center point of a first top washer aperture 230 may be about 0.2504 inches from the center of the top washer 90, and the center point of a top washer aperture 230 may be about 0.2504 inches from the center of the top washer 90, in the opposite direction of the first top washer aperture 230 so that each top washer aperture 230 are about 0.5004 inches apart center to center.

In one embodiment, the top washer 90 may have a radius of about 1.7500 inches, and the top washer aperture 230 may have a diameter of about 0.3750 inches.

In one embodiment, the first member 120 and the second member 130 may be capable of holding loads of up to 5000 pounds.

In one embodiment the first washer 80 and top washer 90 may be comprised of ⅛" metal plates.

In one embodiment the sheath 160 may have a slit that extends the entire longitudinal length of the sheath 160, so that it is removable and replaceable. For example, the sheath member securement device 240 may be removed by unscrewing one portion from the other, and then the sheath 60 may be pulled off as the slit allows the sheath 60 to separate to be removed from the first member 120 or second member 130.

In one embodiment the sheath is made of nylon material.

It should be understood, of course, that the foregoing relates to exemplary embodiments of the invention and that modifications may be made without departing from the spirit and scope of the invention as set forth in the following claims.

I claim:

1. A non single point of failure member slide (10), comprising:
    a first member (120);
    a second member (130) oriented substantially parallel to said first member (120);
    said first member (120) extending through a top washer (90) via a top washer aperture (230), and said second member (130) extending through the top washer (90) via another top washer aperture (230);
    said first member (120) terminating in a first member retention means (100);
    said first member retention means (100) disposed upwardly from said top washer (90);
    said second member (130) terminating in a second member retention means (110) disposed upwardly from said top washer (90);
    a top disk (70) disposed downwardly from said top washer (90);
    said top disk (70) having a top disk aperture (170) for receiving at least one of said first member (120) or said second member (130) therethrough;
    a first disk (60) disposed downwardly from said top disk (70);
    said first disk (60) capable of receiving at least one of said first member (120) or said second member (130) therethrough via a first disk aperture (210).

2. The apparatus of claim 1, further comprising: a first washer (80) disposed downwardly from said top washer (90) wherein said first washer (80) has a plurality of first washer apertures (220) whereby said first member (120) is disposed through one first washer aperture (220) and said second member is disposed through another first washer aperture (220).

3. The apparatus of claim 1, further comprising:
    a sheath (160) securely disposed around both of said first member (120) and said second member (130).

4. The apparatus of claim 3, further comprising:
    a sheath member securement device (240) securely disposed around said sheath (160) to secure said sheath (160) to at least one of said first member (120) and said second member (130).

5. The apparatus of claim 4, wherein said first member (120) extends downwardly from said sheath member securement device (240), and said second member extends downwardly from said sheath member securement device (240), said first member (120) and said second member (130) secured to a dual member belt fastener (200).

6. The apparatus of claim 5, further comprising a second member cylinder (190) that retains an end portion of the second member (130) to a second member loop (150), and a first member cylinder (180) that retains an end portion of the first member (120) to a first member loop (140), both said second member cylinder (190) and said first member cylinder (180) disposed downwardly from said sheath member securement device (240), and upwardly from a dual member belt fastener (200), whereby a safety belt (30) may be secured to said dual member belt fastener (200) and said belt (30) secured to a harness (40) to enable a person to traverse a challenge course as the first disk (60) is in slidable contact with a track member (20).

7. A non single point of failure member slide (10), comprising:
    a first member (120);
    a second member (130);
    said first member (120) and said second member (130) extending through a top washer (90) via two separate top washer apertures (230);
    said first member (120) terminating in a first member retention means (100) upwardly from said top washer (90);
    said second member (130) terminating in a second member retention means (110) upwardly from said top washer aperture (90);
    a first washer (80) disposed downwardly from said top washer (90), said first washer (80) having a first washer aperture (220) to receive at least one of said first member (120) or said second member (130) therethrough;
    a top disk (70) disposed downwardly from said first washer (80);
    said top disk (70) having a top disk aperture (170) for receiving at least one of said first member (120) or said second member (130) therethrough;
    a first disk (60) disposed downwardly from said top disk (70);
    said first disk (60) capable of receiving at least one of said first member (120) or said second member (130) therethrough via a first disk aperture (210);
    a sheath (160) securely disposed around both of said first member (120) and said second member (130);
    a sheath member securement device (240) securely disposed around said sheath (160) to secure said sheath (160) to at least one of said first member (120) and said second member (130);
    said first member (120) extends downwardly from said sheath member securement device (240), and said second member extends downwardly from said sheath member securement device (240), said first member (120) and said second member (130) secured to a dual member belt fastener (200); and
    a second member cylinder (190) securely disposed around said second member (130), and a first member cylinder (180) securely disposed around said first member (120), both of said second member cylinder (190) and said first member cylinder (180) slidably disposed downwardly from said sheath member securement device (240), and upwardly from a dual member belt fastener (200), whereby a safety belt (30) may be secured to said dual member belt fastener (200) and said belt (30) secured to a harness (40) to enable a person to traverse a challenge course as the first disk (60) is slidably disposed within a track member (20).

\* \* \* \* \*